United States Patent Office 2,891,962
Patented June 23, 1959

2,891,962
SULFATION REAGENT AND PROCESS OF MANUFACTURE

James L. Smith and Robert C. Harrington, Jr., Kingsport, Tenn., assignors to Eastman Kodak Company, Rochester, N.Y., a corporation of New Jersey No Drawing. Application September 11, 1956
Serial No. 609,055

7 Claims. (Cl. 260—307)

This invention relates to a sulfation process wherein an improved sulfating agent is employed. More particularly this invention relates to the sulfation of alcohols by procedure wherein an improved sulfating agent is employed.

Sulfation or sulfonation or the like treatment of various organic compounds is a well-known procedure in the industry. Many procedures and materials for carrying out sulfation are described in the prior art, such as Unit Processes in Organic Synthesis, by Groggins. Also, the publication Industrial Engineering Chemistry, September 1954, describes a number of processes for sulfating various organic compounds.

In general in the prior art the sulfating agents used have in many instances been sulfuric acid, chlorosulfonic acid and certain sulfamic acid catalyst combinations. Also, certain special agents have been proposed such as pyridine-sulfurtrioxide, dioxane-sulfurtrioxide and N-, N dialkylalkanamide-sulfurtrioxide complexes. While such prior art sulfating media have been economical and useful for many purposes, such prior art sulfating agents when used on some organic compounds are too drastic or otherwise are not particularly satisfactory in their action. In general one would not choose a more potent sulfating agent than is necessary for a specific purpose, since oxidation and other side reactions can occur. In the sulfating of long-chain alcohols and particularly alcohols which contain a double bond, the use of too drastic a sulfating agent may be particularly disadvantageous.

It is therefore apparent that providing new and improved sulfating media represents a highly desirable result. After extended investigation we have found that a new sulfating media can be produced which permits the carrying out of certain sulfating reactions with greater facility.

This invention has for one object to provide improved sulfating reactions particularly by the use of a new and improved sulfating agent. Another and particular object is to provide a new sulfating agent. Still another object is to provide a method for preparing such new sulfating agent. Still another object is to provide improved processes of sulfating various organic materials and in particular long-chain alcohols utilizing the improved sulfating agent of the present invention. Another object is to provide sulfating processes wherein the sulfating agent may be considered milder or otherwise better in that it is possible by the use of such agent to obtain better sulfation. A particular object is to provide a sulfating agent especially suitable for sulfation of compounds susceptible to oxidation. Other objects will appear hereinafter.

As indicated above, in prior art sulfation processes wherein a sulfating agent, exemplified by fuming sulfuric acid, has been used, the reaction thereof in certain instances has been too vigorous and the resultant sulfated product may not possess as good physical properties as desired. For example, in preparing sulfated unsaturated alcohols for use as textile treating agents it is preferred to obtain a sulfated product wherein the degree of sulfation is high and has taken place principally at the hydroxyl group and not at the double bond. Also, the use of prior art agents such as sulfuric acid may cause a darkening of the sulfated product. As is apparent, the use of darkened chemical treating agents presents the risk that such darkened material can transmit undesired color to the textile being treated, thereby injuring the textile or necessitating the application of further treatment to the textile for restoring its color.

In the broader aspects of our invention we have found that certain modified sulfating media may be provided, which modified media permit the carrying out of the sulfating reactions with greater facility.

In the broader aspects of our invention we have found that certain modified sulfating media may be provided, which modified media permit the carrying out of the sulfating reactions under so-to-speak milder conditions with the beneficial result that improved sulfated products may be obtained.

In accordance with this phase of our invention we prefer to prepare an entirely new sulfating medium. That is, we have found that through the reaction of a carbamate and sulfurtrioxide certain complexes may be produced which are excellent sulfating agents. The rapidity or ease with which these new sulfating agents (sulfurtrioxide complexes) react, is determined to some extent by the electro-negativity of the compound with which the sulfurtrioxide is complexed. The choice of a sulfating agent in accordance with the present invention for a specific purpose is also determined to a substantial extent by the susceptibility of the reacting compound to sulfation. Thus, if a compound to be sulfated in accordance with the present invention is resistant to sulfation, a more potent sulfating agent, one in which the sulfurtrioxide is complexed with a highly electro-negative material, would be preferred. In general, however, one would seldom use a more potent sulfating agent than is necessary for a specific purpose since, as discussed above, too potent a sulfating agent can cause oxidation and other side reactions to occur thereby possibly being detrimental to the product.

Referring now to our preferred operation wherein a new sulfating medium is made, the following description will illustrate this aspect of our invention. The new sulfating compounds of our invention can readily be prepared by the reaction of N-alkyl substituted ethylene carbamates with sulfurtrioxide. An equation for the reaction may be written:

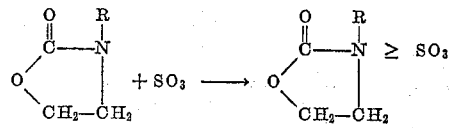

In the above formulas R represents a lower alkyl radical such as methyl, ethyl, propyl and the like.

The N-alkyl ethylenecarbamates used to react with the sulfurtrioxide can be prepared by known methods, one of which is the reaction of monoalkyl ethanol amines with diethyl carbonate. The synthesis of our new sulfating agent (sulfurtrioxide complex) is accomplished by dissolving the carbamate in a solvent which will not react with sulfurtrioxide and then adding sulfurtrioxide to the solution. We have found that the reaction takes place quite easily and consequently temperatures much above 25° C. are usually not employed. In many instances lower temperatures than 25° C. give slightly better yields of the complex. The sulfurtrioxide may be added in the form of a solution in the same solvent or in the form of a gas preferably diluted by an inert gas. The complex which forms is insoluble and may be removed from the reaction mixture by filtration, centrifuging or the like. After drying the complex in a dry atmosphere, it is a white, free-flowing powder which is stable on storing in a closed container. Since the powder reacts slowly with moisture in the air, it is preferred that anhydrous conditions be maintained in storing the powder. A further understanding of the manufacture of our preferred new sulfating complexes will be had from the several examples which follow:

*Example I*

N-methyl ethylenecarbamate-sulfurtrioxide complex was prepared by adding one-tenth of a mole of sulfurtrioxide gas, diluted with nitrogen, through a large bore gas inlet tube, the end of which was below the surface of a solution of one-tenth mole N-methyl ethylenecarbamate in five times its volume of chloroform. During the addition, the temperature of the solution was kept below 25° C. After stirring 15 minutes after the completion of the addition, the product was removed by filtration and washed with a small amount of chloroform. An approximate 100% theoretical yield was obtained.

*Example II*

N-methyl ethylenecarbamate-sulfurtrioxide complex was also prepared in tetrachloroethane. One-tenth mole of sulfur-trioxide in 300 milliliters of tetrachloroethane were added dropwise to one-tenth of a mole of N-methyl ethylenecarbamate in 300 milliliters of tetrachloroethane while the temperature was kept below about 35° C. The product obtained in high yields was further treated by filtration, washing and drying to obtain a white, free-flowing powder.

*Example III*

N-ethyl ethylenecarbamate-sulfurtrioxide complex was prepared essentially as the methyl derivative in Example II, only N-ethyl ethylenecarbamate was substituted for N-methyl ethylenecarbamate. The product and yields were essentially the same.

*Example IV*

N-propyl ethylenecarbamate-sulfurtrioxide complex was prepared essentially as the methyl derivative in Example II, only N-propyl ethylenecarbamate was substituted for N-methyl ethylenecarbamate. The product and yields were essentially the same.

The new and improved sulfating agents produced in accordance with the preceding examples may be effectively used to sulfate various organic compounds particularly long-chain alcohols. The following examples will illustrate the use of our carbamate-sulfur-trioxide complex for such type of sulfation.

*Example V*

Oleyl alcohol was sulfated with N-methyl ethylenecarbamate-sulfurtrioxide complex prepared as in Example II by mixing molar portions of the complex and oleyl alcohol and stirring at about 35° C. for 45 minutes. The carbamate complex disappeared. Neutralization of the product with 2-amino-2-methyl-1-propanol yielded the oleyl acid sulfate salt of the amine, which was soluble in water and an excellent emulsifying agent. The degree of sulfation was very high and took place substantially exclusively at the hydroxyl group and not at the double bond.

*Example VI*

One mole of N-ethylethylenecarbamate-sulfurtrioxide was mixed with one mole oleyl alcohol. Dry nitrogen gas was used as a blanket over the mixture while it was stirred at 25° C. for one hour. At the end of this reaction period, 1.1 moles of 2-amino-2-methyl-1-propanol were added dropwise. A sample of the product had a pH of 7 when diluted with an equal part of water. The sulfated oleyl product was soluble in water and was an excellent emulsifying agent.

*Example VII*

N-methyl ethylenecarbamate-sulfurtrioxide complex was used to sulfate lauryl alcohol. The procedure was very much the same as in Example V, excepting that in this example lauryl alcohol was sulfated instead of oleyl alcohol. That is, approximately molar proportions of lauryl alcohol and N-methyl ethylenecarbamate-sulfurtrioxide complex were thoroughly stirred together and held at a temperature between 30–40° C. for about 55 minutes. After that time the sulfating complex had been consumed and the lauryl alcohol was substantially completely sulfated at the hydroxyl group. The product exhibited excellent emulsifying properties, as evidenced by its ability to emulsify mineral oil in water to form a clear colorless emulsion at a concentration of 25% oil.

*Example VIII*

One part by weight of N-methyl ethylenecarbamate-sulfurtrioxide complex was mixed with 1.5 parts by weight of castor oil. The mixture was stirred for forty-five minutes at 25° C. The product was neutralized to pH 7 with six molar sodium hydroxide. This material was lighter colored and more water soluble than castor oil sulfated with chlorosulfonic acid, sulfuric acid or sulfur trioxide-pyridine or sulfur trioxide-dioxane complexes.

Example *IX*

One part by weight of N-methyl ethylenecarbamate-sulfurtrioxide complex was stirred at 35° C. for one hour with five parts by weight of castor oil. The material was neutralized with triethanolamine and applied to acetate continuous filament yarn from a 25% aqueous solution so that the final concentration on the yarn was 2.5% The yarn had a soft pliable hand and was not discolored by the treatment.

It may be seen from the above that we have provided a new product and method for its preparation. The carbamate-sulfurtrioxide product of the present invention is, as shown by the above examples, particularly useful for the sulfation of alcohols which may contain a double bond.

It is desired to point out more particularly that the complexes of the present invention differ from prior art compounds mentioned above, such as N-, N dialkylanamide-sulfurtrioxide, in that the nitrogen atom in the prior art compounds is less electro-negative than the compounds of the present invention. The compounds of this invention have a more electro-negative nitrogen atom due to the influence of the oxygen in the adjacent ester linkage. Also, the compounds of the present invention are different due to their cyclic structure.

In preparing the new complexes of the present invention, in place of the halogenated hydrocarbon solvents illustrated in the examples, other solvents which are relatively inert toward sulfurtrioxide may be used. Examples of such other solvents are sulfur dioxide, nitromethane, nitrobenzene and carbon disulfide.

An approximate one to one molar ratio of carbamate to trioxide is usually used since the reaction is practically quantitative. If not, one of the reactants would be in excess and consequently wasted. The quantity of the ingredients with respect to the quantity of solvent may vary over a relatively wide range depending upon the equipment and method of mixing used. The solvent serves primarily as a heat transfer agent and facilitates stirring.

While, as indicated, the reaction takes place very readily so that temperatures below 25° C. would generally be used, this does not preclude the use of temperatures up to 50° C. when operating in certain types of equipment.

In a somewhat similar manner, when using our complex for sulfating chemicals, usually relatively low temperatures and short times of reaction will suffice. That is, temperatures between room temperature and 50° C. and times of reaction less than an hour are usually adequate.

However, the use of temperatures up to 100° C. and reaction times of three hours, is not precluded.

As apparent from information set forth in the examples, the sulfated alcohol products obtained can be used as emulsifying agents. However, our sulfated products may also be used for a number of other purposes, of which the incorporation into textile treating materials is a particularly valuable use. For example, 20 parts of a sulfated oleyl alcohol made in accordance with Example V were mixed with 80 parts of mineral oil and applied to cellulose acetate yarn. The coefficient of friction was found to be reduced 50%.

To illustrate further the utility of the present invention, it is pointed out that the N-alkyl ethylenecarbamate-sulfurtrioxide complexes are to be preferred over known sulfating agents, especially for sulfation of certain oxidation sensitive compounds such as castor oil and oleyl alcohol. Sulfation with sulfur trioxide, fuming sulfuric, chlorosulfonic, and sulfuric acids causes severe charring and consequently darkening of the product. Sulfurtrioxide - dimethylsulfate and sulfurtrioxide - dioxane complexes are still too oxidative and should be run at temperatures so close to the melting point of oleyl alcohol that they are impractical. At higher temperatures charring becomes severe. Also, dioxane and dimethylsulfate are toxic and the sulfate is corrosive on hydrolysis. Therefore, they should be completely removed from the product and complete removal can be disagreeable and costly. N,N-dialkyl alkanamide-sulfurtrioxide complexes and sulfamic acid require longer reaction times and higher temperatures than the sulfating agents of this invention.

In brief, the complexes herein disclosed are optimum for oxidation-sensitive compounds such as oleyl alcohol and castor oil.

We claim:

1. Process of manufacturing an improved sulfating agent which comprises dissolving an N-alkyl ethylcarbamate in a solvent relatively inert as respects its tendency to react with sulfurtrioxide, then adding sulfurtrioxide to the solution and during the reaction maintaining the temperature below about 50° C. and separating the resultant sulfurtrioxide complex from the reaction mixture.

2. Process which comprises adding an N-alkyl ethylenecarbamate to chloroform to form a solution thereof, bubbling sulfurtrioxide into the solution while maintaining the temperature below 30° C., agitating the mixture and thereafter isolating the carbamate-sulfurtrioxide complex formed whereby a white, free-flowing powder is obtained.

3. Process for producing a carbamate-sulfurtrioxide complex which comprises dissolving in a solvent a compound having the formula:

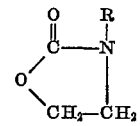

wherein R represents a lower aliphatic radical from the group consisting of methyl, ethyl and propyl, bubbling sulfur trioxide and an inert gas into said solution while holding the temperature of the solution below 30° C., and thereafter separating said complex from the reaction liquid.

4. The process in accordance with claim 3 wherein sulfurtrioxide is added to the reaction as a solution of sulfurtrioxide in a halogenated hydrocarbon solvent.

5. As a new composition of matter a carbamate-sulfurtrioxide complex having the formula:

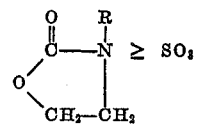

wherein R represents a lower aliphatic radical from the group consisting of methyl, ethyl and propyl.

6. As a new composition of matter N-alkyl ethylenecarbamate sulfurtrioxide complex.

7. As a new composition of matter N-methyl ethylenecarbamate-sulfurtrioxide.

References Cited in the file of this patent

UNITED STATES PATENTS

| | | |
|---|---|---|
| 1,981,901 | Bunbury et al. | Nov. 27, 1934 |
| 2,399,118 | Homeyer | Apr. 23, 1946 |

UNITED STATES PATENT OFFICE

CERTIFICATE OF CORRECTION

Patent No. 2,891,962                                                      June 23, 1959

James L. Smith et al.

It is hereby certified that error appears in the printed specification of the above numbered patent requiring correction and that the said Letters Patent should read as corrected below.

Column 4, lines 45 and 46, for "N-, N dialkyl-anamide" read -- N-, N dialkylalkanamide --; column 5, lines 38 and 39, for "N-alkyl ethylcarbamate" read -- N-alkyl ethylenecarbamate --.

Signed and sealed this 26th day of January 1960.

(SEAL)
Attest:

KARL H. AXLINE                                                     ROBERT C. WATSON
Attesting Officer                                               Commissioner of Patents